United States Patent
Wang et al.

(10) Patent No.: US 6,662,092 B2
(45) Date of Patent: Dec. 9, 2003

(54) FUZZY LOGIC CONTROL METHOD FOR DEPLOYMENT OF INFLATABLE RESTRAINTS

(75) Inventors: Jenne-Tai Wang, Troy, MI (US); Ming Tian, Sterling Heights, MI (US); Mark O. Neal, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 09/736,581

(22) Filed: Dec. 15, 2000

(65) Prior Publication Data

US 2002/0077736 A1 Jun. 20, 2002

(51) Int. Cl.$^7$ .............. G06F 7/00; G05D 1/00; G09G 17/00
(52) U.S. Cl. .............. 701/45; 701/49; 706/46
(58) Field of Search .............. 701/45, 49; 706/4, 706/46, 52, 900, 905; 280/735, 734, 728.1, 802; 307/9.1, 10.1, 10.6; 180/282, 268, 283

(56) References Cited

U.S. PATENT DOCUMENTS

| | | | |
|---|---|---|---|
| 4,985,835 A | 1/1991 | Sterler et al. ......... 364/424.05 |
| 5,014,810 A | * 5/1991 | Mattes et al. ........... 180/268 |
| 5,411,289 A | 5/1995 | Smith et al. ........... 280/735 |
| 5,430,649 A | 7/1995 | Cashler et al. ......... 364/424.05 |
| 5,673,365 A | 9/1997 | Basehore et al. ........... 395/3 |
| RE36,122 E | * 3/1999 | Mattes et al. ........... 180/268 |
| 5,899,949 A | * 5/1999 | Kincaid ................. 701/45 |
| 5,969,599 A | 10/1999 | Wessels et al. ......... 340/436 |
| 6,167,335 A | * 12/2000 | Ide et al. ............... 701/45 |
| 6,186,539 B1 | * 2/2001 | Foo et al. ............. 280/735 |
| 6,199,903 B1 | * 3/2001 | Brambilla et al. ....... 280/735 |
| 6,225,891 B1 | * 5/2001 | Lyons et al. ........... 340/435 |
| 6,275,755 B1 | * 8/2001 | Mon et al. .............. 701/45 |
| 6,326,704 B1 | * 12/2001 | Breed et al. ............ 307/9.1 |
| 6,353,783 B1 | * 3/2002 | Henne et al. ............ 701/45 |
| 6,532,408 B1 | * 3/2003 | Breed .................. 701/45 |

* cited by examiner

Primary Examiner—Tan Q. Nguyen
Assistant Examiner—Dalena Tran
(74) Attorney, Agent, or Firm—Kathryn A. Marra

(57) ABSTRACT

An improved control for the deployment of individual stages of a vehicle inflatable restraint during a crash event utilizes a fuzzy logic control to determine the crash severity, and a deployment control algorithm to control deployment of the restraints based on the determined crash severity and the elapsed time. In a preferred implementation, the crash severity is not determined until the measured acceleration and the corresponding change in velocity exceed respective thresholds, and a prediction of occupant movement due to the measured acceleration exceeds a threshold. Once the respective thresholds are exceeded, the fuzzy logic control is initiated to determine the crash severity, and the deployment control algorithm determines whether to deploy individual stages of the restraint based on comparisons of the determined crash severity and the elapsed time with respective thresholds.

6 Claims, 4 Drawing Sheets

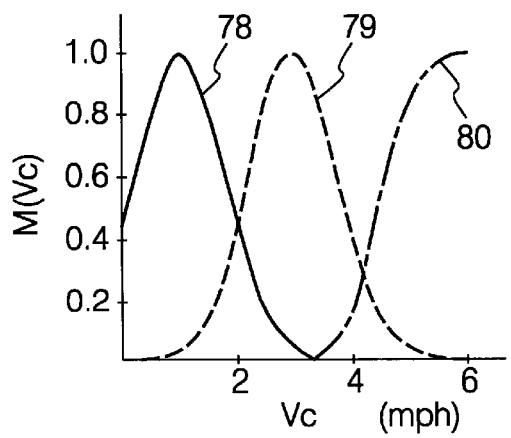
FIG. 4A
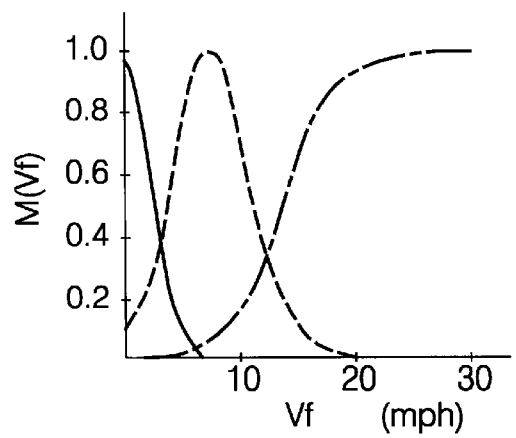
FIG. 4B
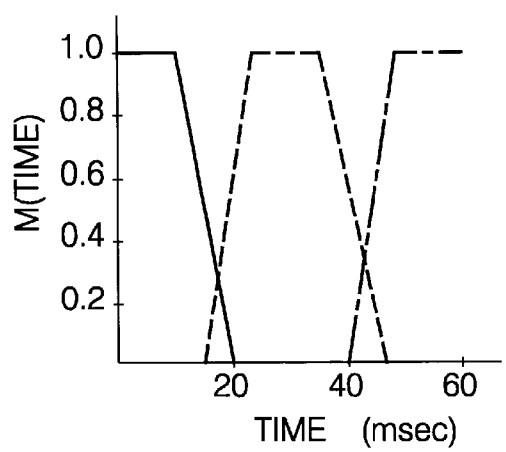
FIG. 4C
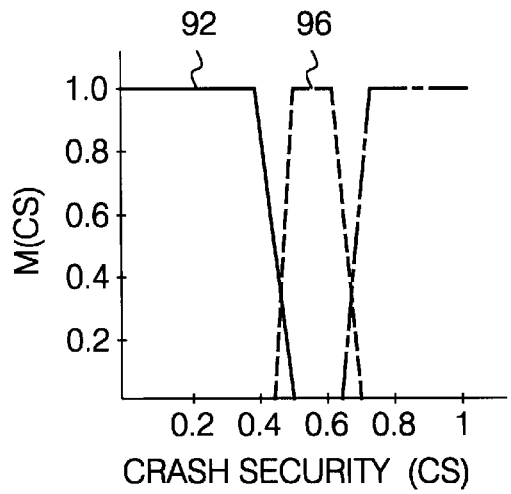
FIG. 4D
|  | M(Vc) | M(Vf) | M(TIME) |
|---|---|---|---|
| SMALL/ EARLY | 0.03 | 0.61 | 0.0 |
| MEDIUM/ MIDDLE | 1.0 | 0.23 | 1.0 |
| LARGE/ LATE | 0.0 | 0.0 | 0.0 |
FIG. 5

| RULE | CRASH SEVERITY | TRUTH |
|---|---|---|
| 1 | MINOR | 0 |
| 2 | MINOR | 0 |
| 3 | SEVERE | 0 |
| 4 | SEVERE | 0 |
| 5 | SEVERE | 0 |
| 6 | MEDIUM | 0 |
| 7 | SEVERE | 0 |
| 8 | MEDIUM | 0.23 |
| 9 | MINOR | 0.03 |
| 10 | MINOR | 0.61 |
| 11 | MEDIUM | 0 |
| 12 | MINOR | 0 |

| CRASH SEVERITY | | TRUTH |
|---|---|---|
| | MINOR | 0.61 |
| | MEDIUM | 0.23 |
| | SEVERE | 0 |

US 6,662,092 B2

FUZZY LOGIC CONTROL METHOD FOR DEPLOYMENT OF INFLATABLE RESTRAINTS

TECHNICAL FIELD

This invention relates to a control method for deploying inflatable restraints in a vehicle crash event, and more particularly to a control method that utilizes fuzzy logic to determine the severity of the crash.

BACKGROUND OF THE INVENTION

Vehicle inflatable restraint systems include one or more acceleration sensors, one or more restraint devices such as frontal or side air bags, and a signal processor for analyzing the acceleration signals and initiating deployment of the restraints if a detected crash is deemed to be sufficiently severe. In general, the acceleration signals are monitored to detect a potential crash event, and then integrated over the course of the detected event to produce a velocity change signal, which in turn can be used to gauge the crash severity; see, for example, U.S. Pat. No. 5,969,599 to Wessels et al. Frequently, numerous higher-order terms such as jerk or oscillation are also utilized to detect certain crash signal characteristics for either enabling or disabling deployment. When the severity measure crosses a deployment threshold (which may be fixed or variable), the restraints are deployed. If the restraints have multiple independently fired stages, multiple deployment thresholds may be used for determining which stages should be deployed; see, for example, U.S. Pat. No. 5,411,289 to Smith et al. Finally, another factor that is sometimes used in connection with restraint deployment involves predicting occupant movement due to the crash based on the measured acceleration signal; see, for example, U.S. Pat. No. 4,985,835 to Sterler et al. and 5,430,649 to Cashler et al.

Unfortunately, the above-described deployment controls frequently do not bear a physically meaningful relationship to the crash data, and therefore tend to require a high degree of calibration effort, particularly in establishing the deployment thresholds. For this and other reasons, it has been proposed to utilize fuzzy logic control principles to control restraint deployment; see, for example, U.S. Pat. No. 5,673,365 to Basehore et al. In this approach, a small number of variables having relevance to the deployment decision are characterized in terms of fuzzy membership functions, and then logically combined based on a number of physically meaningful fuzzy rules and consolidated (de-fuzzified) to form a deploy/no-deploy decision. However, the combination and consolidation of various rules inherent in the fuzzy inference control complicates the process of calibrating the system to produce the correct deployment decision in response to a given set of input conditions. Accordingly, what is needed is a fuzzy logic deployment control having a more direct and user-friendly calibration process.

SUMMARY OF THE INVENTION

The present invention is directed to an improved fuzzy logic control for controlling the deployment of inflatable restraints in a vehicle in response to measured acceleration of the vehicle during a crash event, wherein the fuzzy logic control determines the crash severity, and a deployment control algorithm uses the determined crash severity to control deployment of individual stages of the restraints. In a preferred implementation, the crash severity is not determined until the measured acceleration and the corresponding change in velocity exceed respective thresholds, and a prediction of occupant movement due to the measured acceleration exceeds a threshold. Once the respective thresholds are exceeded, the fuzzy logic control is initiated to determine the crash severity, and the deployment control algorithm determines whether to deploy individual stages of the restraints based on the determined crash severity and the elapsed time of the crash event.

BRIEF DESCRIPTION OF THE DRAWINGS

FIGS. 4A, 4B, 4C and 4D graphically depict membership functions employed by the fuzzy inference routine of FIG. 3 for central velocity, frontal velocity, crash event time, and crash severity, respectively.

FIG. 5 depicts a representative evaluation of the membership functions of FIGS. 4A–4C.

DESCRIPTION OF THE PREFERRED EMBODIMENT

Figure 1:
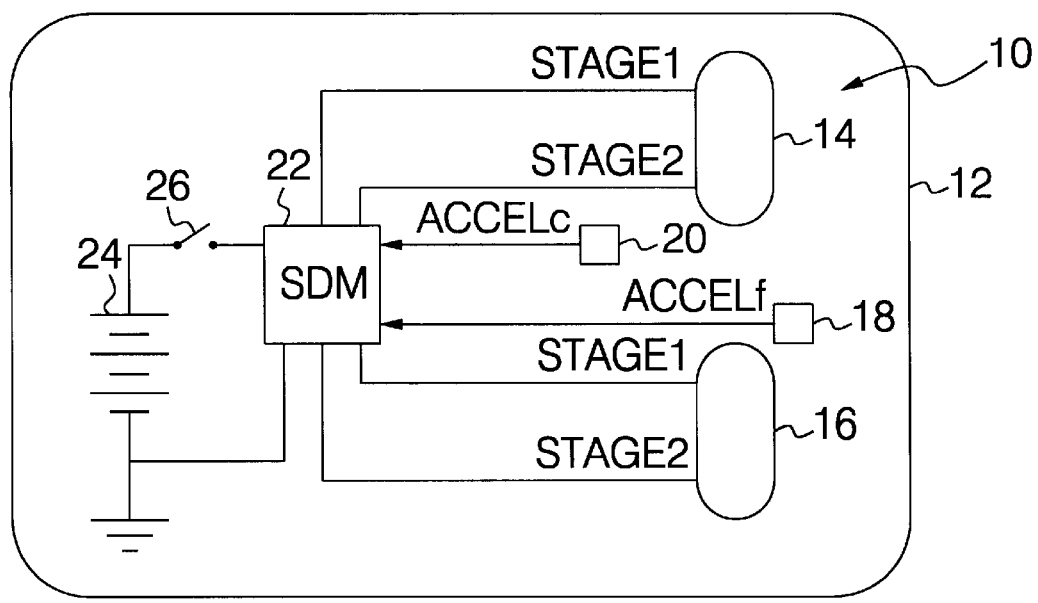
FIG. 1 is a schematic diagram of a vehicle inflatable restraint system, including a microprocessor-based sensing and diagnostic module (SDM) for carrying out the control method of this invention.

Referring to FIG. 1, the reference numeral 10 generally designates an inflatable restraint system for a vehicle 12 equipped with one or more inflatable restraints, such as frontal air bags 14, 16, that are deployed in a serious crash event to protect vehicle occupants. In the illustrated embodiment, the air bags 14, 16 are configured for two stage (STAGE1, STAGE2) deployment, but it will be understood that the method of this invention is applicable to both single stage restraints and variable level restraints which may be deployed in two or more stages. A deployment control system for the restraints 14, 16 includes longitudinal acceleration sensors 18 and 20 for sensing longitudinal acceleration in frontal and central portions of the vehicle, respectively, and a microprocessor-based sensing and diagnostic module (SDM) 22. If desired, the SDM 22 and acceleration sensor 20 may be packaged in a single housing and mounted on a frame element in a central portion of the vehicle 12. The SDM 22 is coupled to a vehicle storage battery 24 via ignition switch 26, and operates to supply battery current to the respective restraints 14, 16 when the acceleration signals ACCELf and ACCELc developed by the acceleration sensors 18 and 20 are indicative of a serious crash. Of course, the number of acceleration and other crash-related sensors utilized in a given system depends on the vehicle structure, weight, and so, and it will be understood that the illustrated system is merely representative in this regard.

Figure 3:
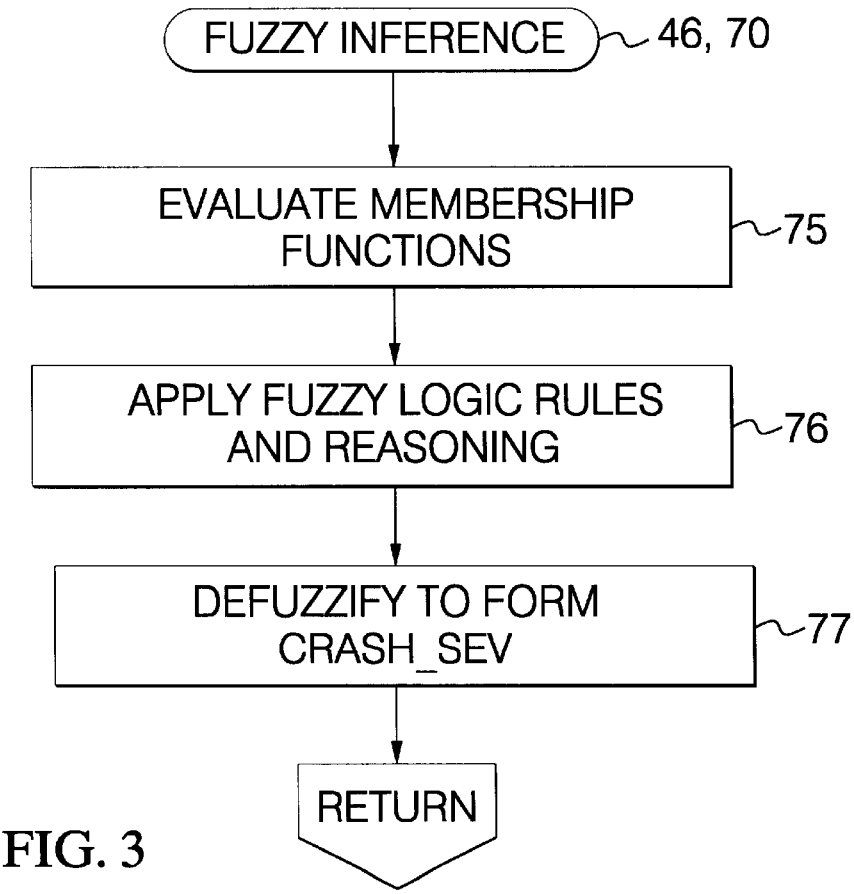
FIG. 3 is a flow diagram illustrating a fuzzy inference routine carried out by the SDM of FIG. 1 according to this invention.
Figure 2:
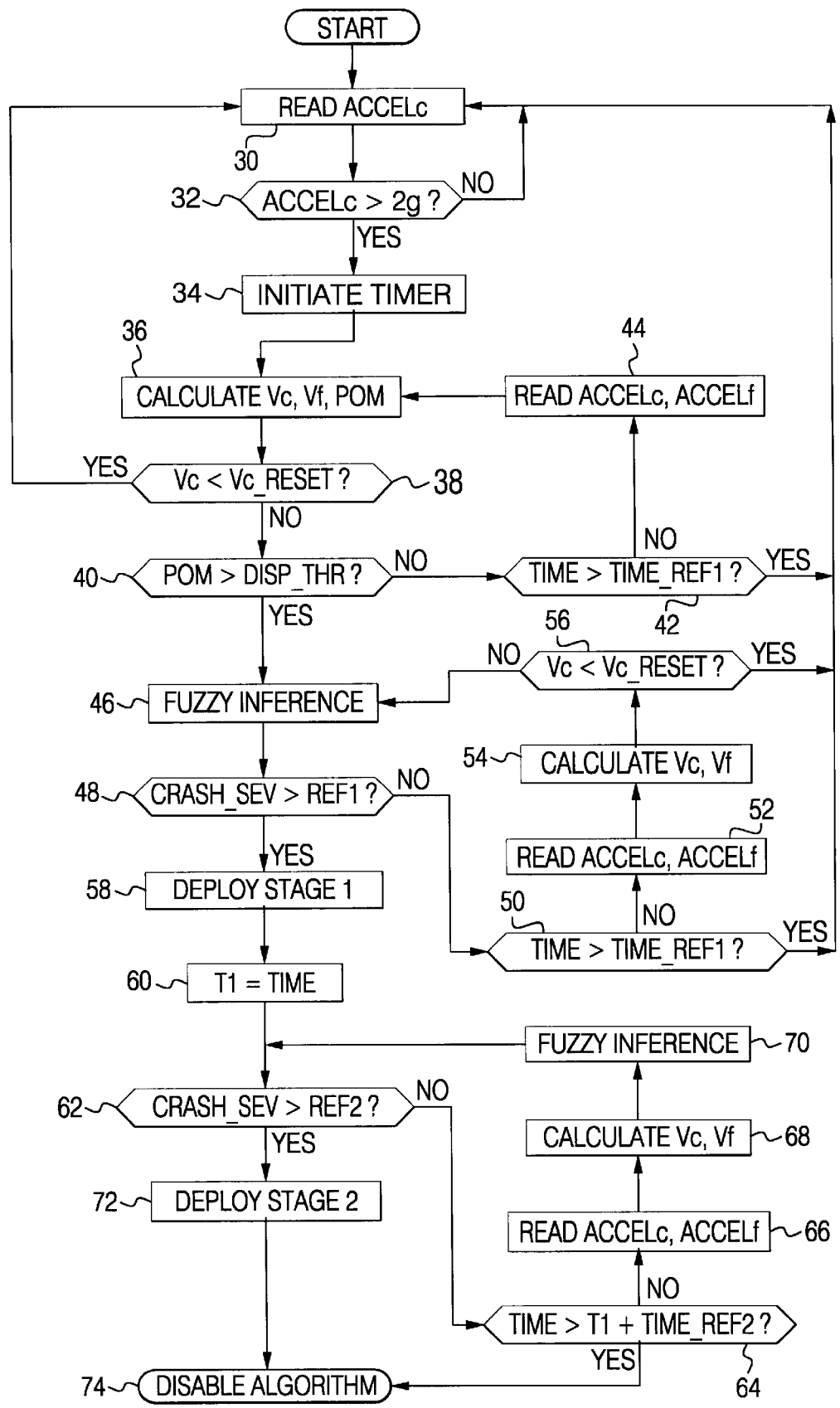
FIG. 2 is a flow diagram illustrating a deployment control algorithm carried out by the SDM of FIG. 1 according to this invention.

The subject of the present invention is the control method carried out by SDM 22 for determining if one or both stages of the restraints 12, 14 should be deployed. Referring to FIGS. 2–3, the control method is depicted as a series of flow diagram steps that are executed by SDM 22 during operation of the vehicle 12 as part of an overall signal processing, diagnostic and control algorithm.

Referring to FIG. 2, the central acceleration signal ACCELc is first read and compared to a threshold (such as 2g), as indicated by the blocks 30 and 32. If ACCELc is less than or equal to the threshold, a crash event is not considered to be in progress, and the blocks 30 and 32 are re-executed as shown. If ACCELc exceeds the threshold, the block 34 initializes a crash event timer for measuring an elapsed time (TIME), and block 36 is executed to calculate central and frontal velocity terms Vc and Vf and a predicted occupant movement term POM. The velocity terms Vc and Vf are computed by filtering and integrating the corresponding acceleration signals ACCELc and ACCELf, and the POM term is computed according to the equation:

$$POM=Sc+(Vc*t_d)+(ACCELc*t_d^2)/2$$

where Sc is a displacement value obtained by integrating the central velocity term Vc, and $t_d$ is a predetermined time duration corresponding, for example, to the time needed to inflate the restraints 14, 16.

Before continuing further in the deployment routine, the block 38 compares Vc to a reset threshold Vc_RESET. If Vc is below Vc_RESET, the blocks 30–36 are re-executed to re-compare the ACCELc to the acceleration threshold, to re-initialize the crash event timer, and to update the velocity and POM terms. If Vc is at least as great as Vc_RESET, the block 40 determines if the predicted occupant movement POM is greater than or equal to a displacement threshold DISP_THR. If POM≦DISP_THR, and the crash event timer has not exceeded a reference time TIME_REF1 (such as 60 msec), the blocks 44, 36 and 38 are re-executed to update the velocity and POM terms and to re-compare Vc to the reset threshold Vc_RESET. If the crash event timer exceeds TIME_REF1, SDM 22 is returned to block 30 to reinitiate the deployment routine. However, if POM exceeds the displacement threshold DISP_THR, block 46 signals execution of the fuzzy inference routine of FIG. 3. As described below, the fuzzy inference routine evaluates the terms Vc, Vf and TIME in terms of predetermined membership functions and applies fuzzy logic rules and reasoning to the membership functions to form a measure of the crash severity, CRASH_SEV. If block 48 determines that CRASH_SEV exceeds a first reference value REF1, the block 58 is executed to deploy STAGE 1 of the restraints 14, 16. However, if CRASH_SEV≦REF1, and block 50 determines that the crash event timer is still less than or equal to TIME_REF1, the blocks 52, 54 and 56 are executed to update the acceleration and velocity terms, and to re-compare Vc with Vc_RESET. If Vc is at least as great as Vc_RESET, the blocks 46 and 48 are re-executed to re-evaluate the crash severity to determine if STAGE 1 of the restraints should be deployed. If Vc<Vc_RESET or the crash event timer exceeds TIME_REF1, SDM 22 is returned to block 30 to re-initiate the deployment routine.

Once deployment of STAGE 1 of the restraints 14, 16 has been commanded by block 58, the block 60 stores the crash event timer value as time T1, and the block 62 is executed to compare CRASH_SEV with a second reference value REF2 which is higher than REF1. If block 62 determines that CRASH_SEV exceeds REF2, the block 72 is executed to deploy STAGE 2 of the restraints 14, 16. However, if CRASH_SEV≦REF2, block 64 compares the crash event timer to the sum (T1+TIME_REF2), where TIME_REF2 is a second time reference (such as 10 msec). If the time elapsed since deployment of STAGE 1 exceeds TIME_REF2, block 64 will be answered in the affirmative, and block 74 is executed to disable further execution of the deployment algorithm. Otherwise, the blocks 66, 68 and 70 are executed to update the acceleration and velocity terms, and to re-evaluate the crash severity, and block 62 is re-executed to re-compare CRASH_SEV with the threshold REF2 as explained above.

Referring to FIG. 3, the fuzzy inference routine essentially involves three steps. First, as indicated by block 75, a set of membership functions M(Vc), M(Vf), M(TIME) is evaluated for each of the terms Vc, Vf and TIME. This step is illustrated by FIGS. 4A, 4B and 4C which depict representative membership functions M(Vc), M(Vf) and M(TIME), respectively, and FIG. 5 which depicts an evaluation of such membership functions for given values of Vc, Vf and TIME. In each of the FIGS. 4A–4C, the solid trace represents a low membership function, the dashed line trace represents a medium membership function, and the chain trace represents a high membership function. Referring to FIG. 4A, for example, the trace 78 may be referred to as a "Vc IS LOW" membership function, and the truth of such function has a value between zero and one depending on the magnitude of Vc computed in the deployment routine of FIG. 2. In a similar way, the trace 79 represents a "Vc IS MEDIUM" function, and the trace 80 represents a "Vc IS HIGH" function. The table of FIG. 5 represents an evaluation of the membership functions M(Vc), M(Vf), M(TIME) for the condition where Vc=3 mph, Vf=2 mph and TIME=30 msec. For Vc=3 mph, the small, medium and large components of membership function M(Vc) have the values 0.03, 1.0 and 0.0, respectively. For Vf=2 mph, the small, medium and large components of membership function M(Vf) have the values 0.61, 0.23 and 0.0, respectively. Finally, for TIME=30 msec, the early, middle and late components of membership function M(TIME) have the values 0.0, 1.0 and 0.0, respectively.

Figures 6A, 6B, 7:
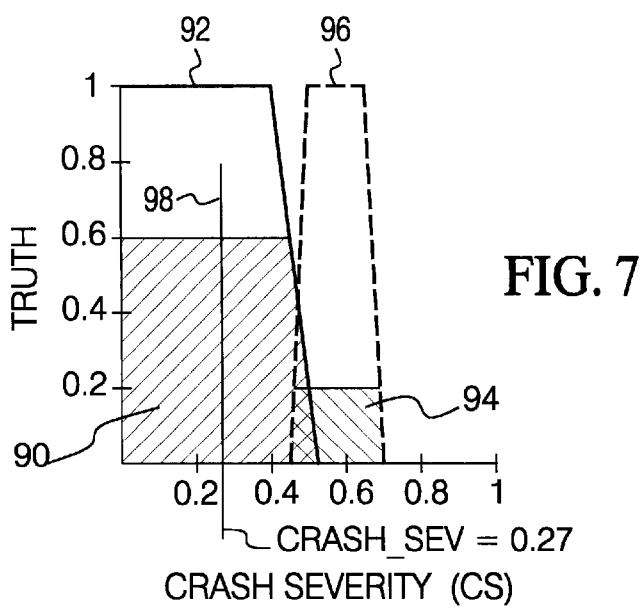
FIGS. 6A and 6B respectively depict representative applications of the fuzzy rules and reasoning employed by the fuzzy inference routine of FIG. 3.
FIG. 7 graphically depicts a representative application of a de-fuzzification technique employed by the fuzzy inference routine of FIG. 3.

The second step of the fuzzy inference process, designated by block 76 of FIG. 3, is the application of fuzzy logic rules and reasoning to the evaluated membership functions M(Vc), M(Vf) and M(TIME). A set of rules is developed for characterizing the crash event as MINOR, MEDIUM or SEVERE, and the rules are applied to the relative truth values (such as shown in the table of FIG. 5) to determine the relative truth of the respective crash characterizations. An exemplary set of characterizing rules is set forth below:

1. (Vc is low) & (TIME is early)=Crash is MINOR
2. (Vf is low) & (TIME is early)=Crash is MINOR
3. (Vc is high) & (Vf is high) & (TIME is early)=Crash is SEVERE
4. (Vc is medium) & (Vf is high) & (TIME is early)=Crash is SEVERE
5. (Vc is high) & (Vf is high) & (TIME is middle)=Crash is SEVERE
6. (Vc is high) & (Vf is medium) & (TIME is middle)=Crash is MEDIUM
7. (Vc is medium) & (Vf is high) & (TIME is middle)=Crash is SEVERE
8. (Vc is medium) & (Vf is medium) & (TIME is middle)= Crash is MEDIUM
9. (Vf is low) & (TIME is middle)=Crash is MINOR
10. (Vf is low) & (TIME is middle)=Crash is MINOR
11. (Vc is high) & (Vf is medium) & (TIME is late)=Crash is MEDIUM
12. (TIME is late)=Crash is MINOR FIG. 6A depicts an application of the above rules to the membership function truth values depicted in the table of FIG. 5 to form a truth value for each rule. The truth value for each rule is the minimum of the respective component membership function truth values. For example, the truth value for rules 1–7 and 11–2 are zero because, in each case, at least one component of the rule (Vc is large, for example) is zero. However, rules 8–10 have non-zero truth values, again determined by the minimum of the component membership function truth values. For example, rule 8 has a truth value of 0.23, which is the minimum of 1.0, 0.23 and 1.0. Similarly, rule 9 has a truth value of 0.03 and rule 10 has a truth value of 0.61. In other words, for the given set of input conditions, the crash is characterized as MEDIUM by truth value 0.23, and as MINOR by truth values 0.03 and 0.61. The overall truth value for each crash characterization is then determined according to the maximum respective truth value, as indicated in the table of FIG. 6B. Thus, for the given example, the characterization "Crash is MINOR" has an overall truth value of 0.61, the characterization "Crash is MEDIUM" has an overall truth value of 0.23, and the characterization "Crash is SEVERE" has an overall truth value of 0.

The third step of the fuzzy inference process, designated by block 77 of FIG. 3, involves consolidation or de-fuzzification of the crash characterization truth values developed at block 76 in order to form the crash severity indication CRASH_SEV used in the deployment routine of FIG. 2. In the illustrated embodiment, this is achieved by utilizing a "center-of-area" technique, as graphically depicted in FIG. 7. Areas corresponding to each of the crash characterizations are formed using the crash characterization truth values and a crash severity membership function M(CS) such as depicted in FIG. 4D. For example, the "Crash is MINOR" characterization has an area designated by the reference numeral 90 in FIG. 7 which is bounded by the "Crash is MINOR" membership function trace 92 of FIG. 4D, but having a height determined by the corresponding crash characterization truth value (from the table of FIG. 6B) of 0.61. Similarly, the "Crash is MEDIUM" characterization has an area designated by the reference numeral 94 in FIG. 7 which is bounded by the "Crash is MEDIUM" membership function trace 96 of FIG. 4D, but having a height determined by the corresponding crash characterization truth value of 0.23. There is no area corresponding to the "Crash is SEVERE" characterization since the respective crash characterization truth value is zero. The horizontal (or x-axis) center of the combined areas 90 and 94 in FIG. 7 is then determined, as indicated by the line 98, and the crash severity term CRASH_SEV is determined in accordance with the corresponding crash severity (CS) value of 0.27, as indicated.

In summary, the control of this invention utilizes fuzzy logic to determine the severity of a crash event once the measured acceleration, the corresponding change in velocity, and a prediction of occupant movement due to the measured acceleration exceed respective thresholds, and then utilizes a deployment control algorithm to control deployment of individual stages of the restraints based on simple comparisons of the determined crash severity and the elapsed time with respective thresholds. While described in reference to the illustrated embodiment, it will be understood that various modifications in addition to those mentioned above will occur to those skilled in the art, and that control methods incorporating such modifications may fall within the scope of this invention, which is defined by the appended claims.

What is claimed is:

1. A control method for controlling deployment of individual stages of a vehicle inflatable restraint based on a plurality of measures of longitudinal vehicle acceleration during a crash event and an elapsed time of the crash event, the method comprising the steps of:

computing a change in velocity corresponding to the measured longitudinal acceleration in frontal and central portions of the vehicle;

predicting an occupant displacement due to the measured longitudinal acceleration in the central portion of the vehicle;

comparing the predicted occupant displacement to a displacement threshold;

if the predicted occupant displacement exceeds said displacement threshold, then determining a severity of the crash event by applying fuzzy logic membership functions and predetermined fuzzy logic rules to the elapsed rime and the computed change in velocity; comparing the determined crash severity with a first crash severity threshold associated with a first stage of the restraint;

resetting the elapsed time of the crash event if the elapsed time is greater than a reference time;

repeating the step of determining the severity of the crash event if the comparison reveals that the determined crash severity is less than the first crash severity threshold and the elapsed time is less than said reference time; and initiating deployment of the first state of the restraint if the comparison reveals that the determined crash severity exceeds the first crash severity threshold.

2. The control method of claim 1, wherein the step of determining the severity of the crash event includes the steps of:

applying the elapsed time and the computed change in velocity to respective predetermined membership functions;

evaluating truth values for different levels of crash severity using predetermined membership function rules; and consolidating said truth values to determine the severity of the crash event.

3. The control method of claim 1, including the steps of:

obtaining first and second measures of vehicle longitudinal acceleration in frontal and central portions of the vehicle during the crash event;

computing first and second changes in velocity corresponding to the respective first and second measures of vehicle acceleration; and determining the severity of the crash event by applying fuzzy logic membership functions and predetermined fuzzy logic rules to the elapsed time and the first and second computed changes in velocity.

4. The control method of claim 1, wherein the step of controlling deployment of the individual stages of the restraint includes the step of:

comparing the determined crash severity to different crash severity thresholds associated with different individual stages of the restraint.

5. A control method for controlling deployment of individual stages of a vehicle inflatable restraint based on a plurality of measures of longitudinal vehicle acceleration during a crash event and an elapsed time of the crash event, the method comprising the steps of:

computing a change in velocity corresponding to the measured longitudinal acceleration in frontal and central portions of the vehicle;

determining a severity of the crash event by applying fuzzy logic membership functions and predetermined fuzzy logic rules to the elapsed time and the computed change in velocity;

initiating deployment of a first stage of the restraint if the determined crash severity exceeds a first crash severity threshold associated with a first stage of the restraint;

after initiating deployment of the first stage of the restraint, comparing the determined crash severity with a second crash severity threshold that is larger than the first crash severity threshold;

repeating the step of determining the severity of the crash event if the comparison reveals that the determined crash severity is less than the second crash severity threshold and the elapsed time since initiating deployment of the first stage of the restraint is less than a reference time; and initiating deployment of a second stage of the restraint if the comparison reveals that the determined crash severity exceeds the second crash severity threshold.

6. The control method of claim 5 including the step of:

discontinuing the control method if the elapsed time is greater than said reference time.

* * * * *